US010719497B2

(12) United States Patent
D'Halluin et al.

(10) Patent No.: US 10,719,497 B2
(45) Date of Patent: Jul. 21, 2020

(54) UTILIZATION OF OPTIMIZED ORDERED METADATA STRUCTURE FOR CONTAINER-BASED LARGE-SCALE DISTRIBUTED STORAGE

(71) Applicant: Western Digital Technologies, Inc., San Jose, CA (US)

(72) Inventors: Carl Rene D'Halluin, Zwijnaarde (BE); Koen De Keyser, Sint-Denijs-Westrem (BE)

(73) Assignee: Western Digital Technologies, Inc., San Jose, CA (US)

( * ) Notice: Subject to any disclaimer, the term of this patent is extended or adjusted under 35 U.S.C. 154(b) by 105 days.

(21) Appl. No.: 15/944,760

(22) Filed: Apr. 3, 2018

(65) Prior Publication Data

US 2019/0188291 A1 Jun. 20, 2019

Related U.S. Application Data

(60) Provisional application No. 62/599,019, filed on Dec. 15, 2017.

(51) Int. Cl.
*G06F 16/22* (2019.01)
*H04L 29/08* (2006.01)
*G06F 16/27* (2019.01)
*G06F 16/28* (2019.01)
*G06F 16/2453* (2019.01)

(52) U.S. Cl.
CPC ...... *G06F 16/2272* (2019.01); *G06F 16/2453* (2019.01); *G06F 16/27* (2019.01); *G06F 16/285* (2019.01); *H04L 67/1097* (2013.01)

(58) Field of Classification Search
CPC ......... G06F 16/2272; G06F 7/00; G06F 17/30
See application file for complete search history.

(56) References Cited

U.S. PATENT DOCUMENTS

| 7,739,312 B2 | 6/2010 | Gordon et al. |
| 2011/0040795 A1* | 2/2011 | Gordon ................. G06F 3/0607 707/792 |

OTHER PUBLICATIONS

Chang et al., Bigtable: A Distributed Storage System for Structured Data, USENIX OSDI paper, 2006, p. 205-218.
Decandia et al., Amazon's Highly Available Key-value Store, Amazon.com, Oct. 14, 2007, p. 205-220, Washington, USA.

* cited by examiner

*Primary Examiner* — Etienne P Leroux
(74) *Attorney, Agent, or Firm* — Patent Law Works LLP

(57) ABSTRACT

An ordered data object identifier denoted by a value is assigned to each data object grouped to a container object, wherein data object identifiers with successively incremented values are assigned to successive data objects. An ordered container identifier is assigned to each container object with the greatest value of the identifiers of the data objects grouped thereto. A metadata structure with an entry for each container objects is stored. Each entry comprises the ordered container identifier and a reference to the corresponding data. The metadata structure is ordered according to the values of the container identifiers. A request to read a data object contains a corresponding data object identifier. It is determined to which container object the data object is grouped, by locating the first container identifier in the metadata structure with a value greater than or equal to that the requested data object.

20 Claims, 3 Drawing Sheets

UTILIZATION OF OPTIMIZED ORDERED METADATA STRUCTURE FOR CONTAINER-BASED LARGE-SCALE DISTRIBUTED STORAGE

TECHNICAL FIELD

The present disclosure pertains generally to storage systems, and more specifically to the utilization of an optimized ordered metadata structure for container-based large-scale distributed storage.

BACKGROUND

The rise in electronic and digital device technology has rapidly changed the way society communicates, interacts, and consumes goods and services. Modern computing devices allow organizations and users to have access to a variety of useful applications in many locations. Using such applications results in the generation of a large amount of data. Storing and retrieving the produced data is a significant challenge associated with providing useful applications and devices.

The data generated by online services and other applications can be stored at data storage facilities. As the amount of data grows, having a plurality of users sending and requesting data can result in complications that reduce efficiency and speed. Quick and reliable access in storage systems is important for good performance.

In a storage system, it is advantageous to group a plurality of small data objects into a large object. This is especially true in distributed storage systems where data objects are replicated across multiple storage devices. Storing a large data object in a distributed storage system is more efficient than storing a plurality of small data objects. In practice, the storage cost of small data objects is typically higher, because storing a plurality of these small data objects increases the number of Input/output Operations Per Second ("IOPS") required for storing a specific amount of data. Encoding a plurality of such small data objects also results in a higher use of the available processing power, memory, bandwidth, metadata overhead, etc. Further, in practice small data objects typically consume more than the theoretical storage capacity, because of the effects of low-level padding, such as, for example, padding for alignment to the block size of a file system or block layer.

On the other hand, certain problems arise when a distributed storage system groups a plurality of small data objects, for example into a container object which can be more advantageously stored. Tracking the metadata concerning the smaller objects and container object conventionally results not only in overhead, but the potential for inconsistency and loss of data integrity. A conventional mechanism for providing metadata to allow for the mapping between the data objects and their respective container objects for subsequent retrieval is to schematically map the identifiers of the data objects to the identifiers of the respective container objects in a data structure such as an ordered Key Value Store ("KVS"). For example, suppose data objects A, B, C are grouped for storage by means of a container object C1, and data objects C, D, E are grouped for storage by means of a container object C2. A conventional data structure for lookup and retrieval of the objects could look like A->C1, B->C1, C->C1, D->C2, E->C2, F->C2.

In the context of a large-scale distributed object storage system, problems arise to keep such data structures efficient, responsive, robust and consistent. This is especially so when operations are performed which involve a large number of data objects, such as for example a repair operation of a broken or unavailable storage element, storage node, data center, etc. This is also the case during operations in which the contents of container objects is changed, for example during a compaction operation in which a subset of data objects stored in a plurality of container objects is merged into another container object in order to reclaim storage space of deleted or obsolete data objects.

It would be desirable to address at least these issues.

SUMMARY

An ordered data object identifier denoted by a value is assigned to each data object grouped to a container object, wherein ordered data object identifiers with successively incremented ordered values are assigned to successive data objects across multiple container objects. An ordered container identifier is assigned to each container object, such that each assigned ordered container identifier has the greatest value of the identifiers of the data objects grouped to the container object. A metadata structure with an entry for each specific one of the multiple container objects is stored and maintained. Each entry comprises at least the assigned ordered container identifier and a reference to the data of the corresponding container object. The metadata structure is ordered according to the values of the ordered container identifiers. In one embodiment, a key and a value for each specific one of the multiple container objects is maintained in the metadata structure, wherein keys comprise corresponding ordered container identifiers, and values comprise pointers to corresponding metadata collections. A metadata collection corresponding to a specific container object can comprise an ordered list of ordered data object identifiers and corresponding metadata for each specific one of the data objects grouped to the specific container object, and a pointer to data of the specific container object.

A request to read or otherwise access a specific data object grouped to one of the multiple container objects contains a corresponding ordered data object identifier. It can be determined to which one of the multiple container objects the requested data object is grouped, by locating the first ordered container identifier in the ordered metadata structure for which the value is greater than or equal to the ordered data object identifier of the requested data object. The information in the entry of the ordered metadata structure corresponding to the determined container object can then be used to fulfill the access request.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method comprising: assigning ordered data object identifiers with successively incremented values to successive data objects across multiple container objects; that the assigning of the ordered data object identifiers further includes assigning an ordered data object identifier denoted by a value to each data object of multiple data objects grouped to a container object of the multiple container objects, by a container object manager executing on a storage server; assigning, by the container object manager executing on the storage server, an ordered container identifier to each specific container object of the multiple container objects; that each assigned ordered container identifier has a greatest value of an ordered data object identifier assigned to any data object grouped to the specific container object; storing, by the container object manager executing on the storage server, an ordered metadata structure with an entry for each specific container object of the multiple container objects; that each entry includes at least the assigned ordered container identifier and a reference to data of the specific one of the container objects; that the ordered metadata structure is ordered according to values of ordered container identifiers; receiving, by the container object manager executing on the storage server, an access request to access a specific data object grouped to one of the multiple container objects; that the access request contains a corresponding ordered data object identifier; determining to which container object of the multiple container objects the specific data object is grouped by locating a first ordered container identifier in the ordered metadata structure with a value greater than or equal to the ordered data object identifier of the specific data object, by the container object manager executing on the storage server; and utilizing information in an entry of the ordered metadata structure corresponding to the determined container object to which the specific data object is grouped to fulfill the received access request, by the container object manager executing on the storage server.

One general aspect includes a computer system including: means for assigning ordered data object identifiers with successively incremented values to successive data objects across multiple container objects; that the assigning of the ordered data object identifiers further includes assigning an ordered data object identifier denoted by a value to each data object of multiple data objects grouped to a container object of the multiple container objects; means for assigning an ordered container identifier to each specific container object of the multiple container objects; that each assigned ordered container identifier has a greatest value of an ordered data object identifier assigned to any data object grouped to the specific container object; means for storing an ordered metadata structure with an entry for each specific container object of the multiple container objects; that each entry includes at least the assigned ordered container identifier and a reference to data of the specific one of the container objects, where the ordered metadata structure is ordered according to values of ordered container identifiers; means for receiving an access request to access a specific data object grouped to one of the multiple container objects; that the access request contains a corresponding ordered data object identifier; means for determining to which container object of the multiple container objects the specific data object is grouped by locating a first ordered container identifier in the ordered metadata structure with a value greater than or equal to the ordered data object identifier of the specific data object; and means for information in an entry of the ordered metadata structure corresponding to the determined container object to which the specific data object is grouped to fulfill the received access request.

One general aspect includes at least one non-transitory computer readable-storage medium storing computer executable instructions that, when loaded into computer memory and executed by at least one processor of a computing device, cause the computing device to execute the following operations: assigning ordered data object identifiers with successively incremented values to successive data objects across multiple container objects, where the assigning the ordered data object identifiers further includes assigning an ordered data object identifier denoted by a value to each data object of multiple data objects grouped to a container object of the multiple container objects, assigning an ordered container identifier to each specific container object of the multiple container objects, where each assigned ordered container identifier has a greatest value of an ordered data object identifier assigned to any data object grouped to the specific container object, storing an ordered metadata structure with an entry for each specific container object of the multiple container objects, where each entry includes at least the assigned ordered container identifier and a reference to data of the specific one of the container objects, where the ordered metadata structure is ordered according to values of ordered container identifiers, receiving an access request to access a specific data object grouped to one of the multiple container objects, where the access request containing a corresponding ordered data object identifier, determining to which container object of the multiple container objects the specific data object is grouped by locating a first ordered container identifier in the ordered metadata structure with a value greater than or equal to the ordered data object identifier of the specific data object, and utilizing information in an entry of the ordered metadata structure corresponding to the determined container object to which the specific data object is grouped to fulfill the received access request.

Other embodiments of this aspect include corresponding computer systems, system means, apparatus, and computer programs recorded on one or more computer storage devices, each configured to perform the actions of the methods.

Some implementations may optionally include one or more of the following features: that storing the ordered metadata structure with the entry for each specific container object of the multiple container objects further includes maintaining a key and a value for each specific container object of the multiple container objects; that keys include corresponding ordered container identifiers and values include corresponding metadata collections; that a metadata collection corresponding to a specific container object includes an ordered data object identifier and corresponding metadata for each specific one of the multiple data objects grouped to the specific container object, and a reference to data of the specific container object; that a metadata collection corresponding to a specific container object includes an ordered list of ordered data object identifiers and corresponding metadata for each specific one of the multiple data objects grouped to the specific container object, and a pointer to data of the specific container object; that values of the ordered metadata structure further include references to metadata collections; that values of the ordered metadata structure further include content of metadata collections that utilizing information in the entry of the ordered metadata structure corresponding to the determined container object to which the specific data object is grouped to fulfill the received access request further includes using a metadata collection corresponding to the determined container object to access data of the determined container object corresponding to the specific data object; that merging a first container object and a second container object, where the first container object and the second container object have consecutive entries in the ordered metadata structure, include creating a new container object, determining which of the first container object and the second container object has an ordered container object identifier with a greater value, assigning to the new container object the ordered container object identifier of the determined one of the first container object and the second container object having the ordered container object identifier with the greater value, with an incremented indicator of a number of merge operations to which the determined one of the first container object and the second container object has been subject, grouping a subset of the multiple data objects grouped to the first container object and to the second container object to the new container object, the subset of the data objects including of data objects grouped to the first container object and to the second container object that are to remain in existence after completion of the merging of the first container object and the second container object, inserting an entry corresponding to the new container object in the ordered metadata structure after an entry corresponding to the determined one of the first container object and the second container object having the ordered container object identifier with the greater value, where the inserted entry includes at least the ordered container object identifier assigned to the new container object and a reference to data of the new container object, deleting entries in the ordered metadata structure corresponding to the first container object and the second container object, responsive to inserting the entry corresponding to the new container object in the ordered metadata structure, and deleting the first container object and the second container object after deleting the entries in the ordered metadata structure corresponding to the first container object and the second container object; receiving a request to access a certain data object grouped to the new container object, after inserting the entry corresponding to the new container object in the ordered metadata structure and prior to deleting the entries in the ordered metadata structure corresponding to the first container object and the second container object; utilizing information in an entry of the ordered metadata structure corresponding to a given one of the first container object or the second container object to which the certain data object is grouped to fulfill the received access request; responsive to a delay exceeding a given threshold between accessing the ordered metadata structure and retrieval of the specific data object, retrying to access the specific data object by executing a new lookup in the ordered metadata structure; that deleting the entries in the ordered metadata structure corresponding to the first container object and the second container object further includes deleting the entry in the ordered metadata structure corresponding to the determined one of the first container object and the second container object having the ordered container object identifier with the greater value; storing the ordered metadata structure in random access memory; and that the received access request further includes a read request.

Note that the above list of features is not all-inclusive and many additional features and advantages are contemplated and fall within the scope of the present disclosure. Moreover, the language used in the present disclosure has been principally selected for readability and instructional purposes, and not to limit the scope of the subject matter disclosed herein.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The present disclosure describes technology, which may include methods, systems, apparatuses, computer program products, and other implementations, for task scheduling through an operating system agnostic system abstraction layer from a top of the rack switch in hyper converged infrastructure. In the following description, for purposes of explanation, numerous specific details are set forth to provide a thorough understanding of the various aspects of different example embodiments. Note that any particular example embodiment may in various cases be practiced without all of the specific details and/or with variations, permutations, and combinations of the various features and elements described herein.

As described in detail below, a container object manager efficiently and robustly manages grouping a large number of small data into container objects across a large-scale distributed storage system. To do so, the object container manager executes novel functionality for mapping data objects to container objects through an ordered metadata structure which enables the access of specific data objects in the container objects, and the handling of the container objects themselves, including merging them. This provides increased responsiveness and data coherency, even during compaction operations to optimize storage capacity.

Figure 1:
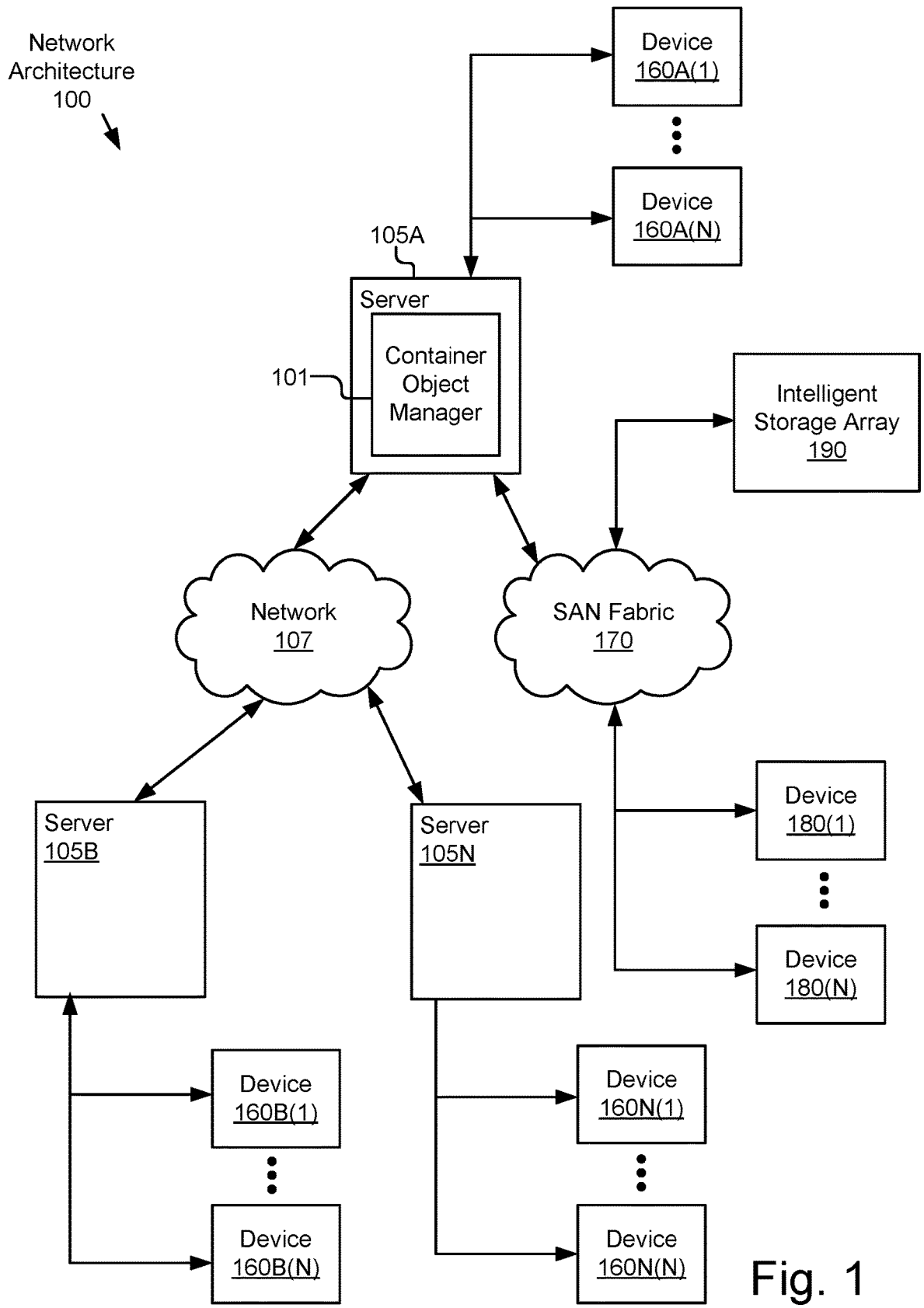
FIG. 1 is a diagram of a distributed storage architecture in which a container object manager can operate, according to one embodiment.

FIG. 1 illustrates an exemplary distributed storage architecture 100 in which a container object manager 101 can be implemented. In the illustrated distributed storage architecture 100, storage servers 105A, 105B and 105N are communicatively coupled via a network 107. A container object manager 101 is illustrated as residing on storage server 105A. It is to be understood that the container object manager 101 can reside on more, fewer or different computing devices as desired. In FIG. 1, storage server 105A is further depicted as having storage devices 160A(1)-(N) attached, storage server 105B is further depicted as having storage devices 160B(1)-(N) attached, and storage server 105N is depicted with storage devices 160N(1)-(N) attached. It is to be understood that storage devices 160A(1)-(N), 160B(1)-(N) and 160N(1)-(N) can be instantiated as electromechanical storage such as hard disks, solid state storage such as flash memory, other types of storage media, and/or combinations of these.

Although three storage servers 105A-N each coupled to three devices 160(1)-(N) are illustrated for visual clarity, it is to be understood that the storage servers 105A-N can be in the form of rack mounted computing devices, in a data center comprising many large storage racks each housing a dozen or more storage servers 105, hundreds of storage devices 160 and a fast network 107. It is to be understood further that a distributed storage architecture 100 can be physically instantiated across multiple data centers in multiple locations, including different cities or continents.

Figure 2:
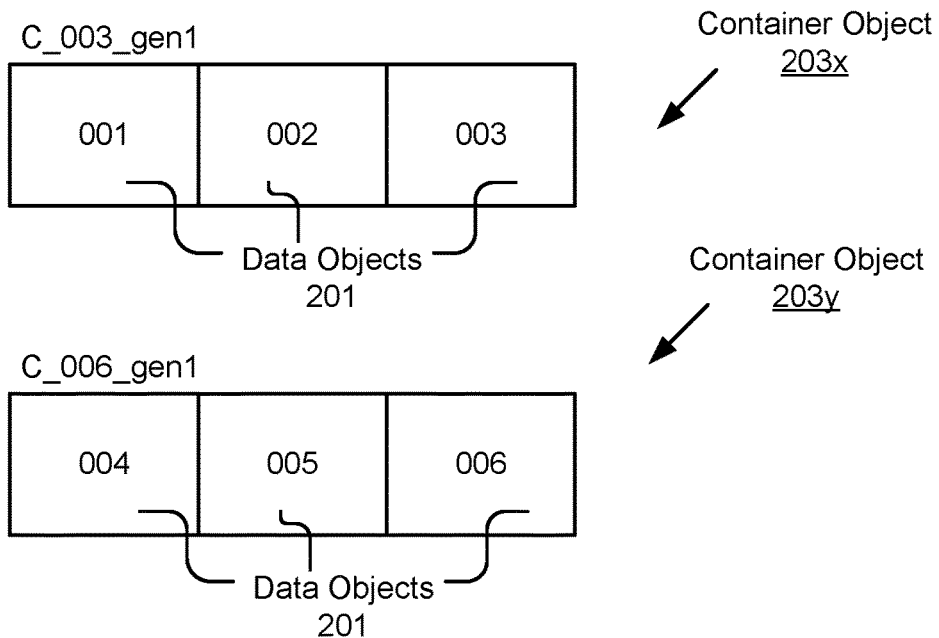
FIG. 2 is a diagram of two container objects, according to one embodiment.
Figure 3:
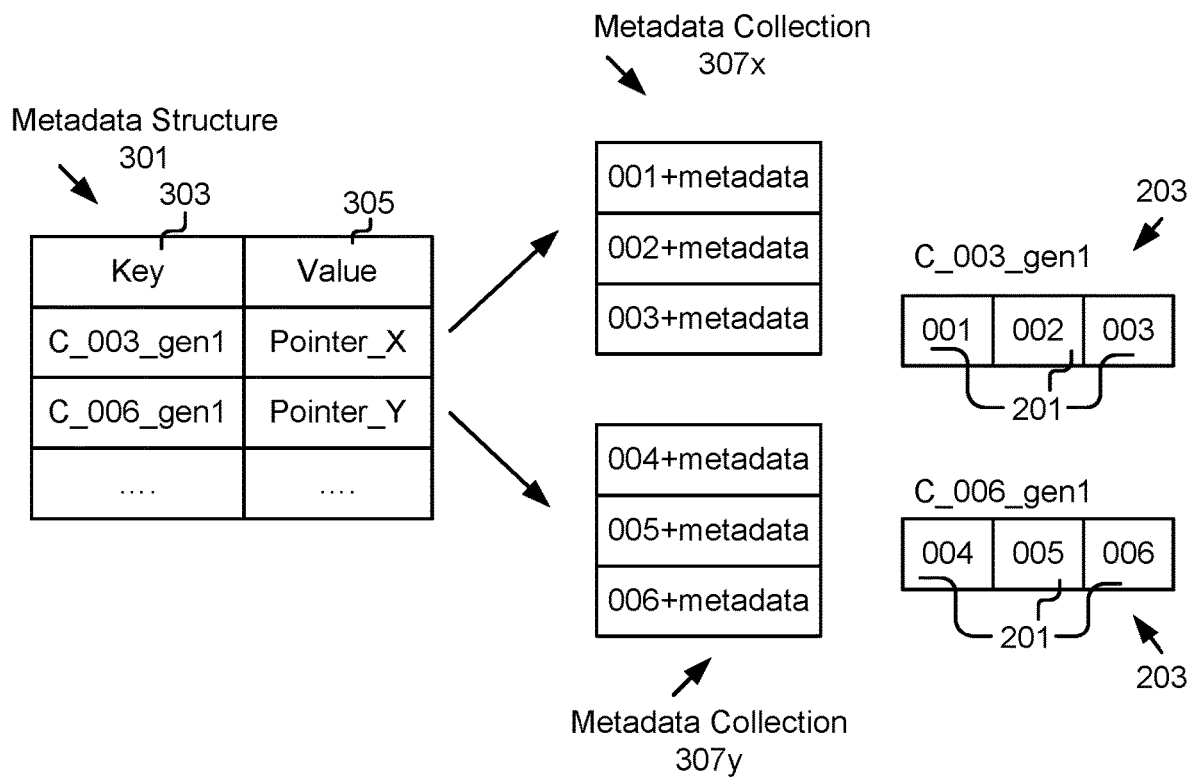
FIG. 3 is a diagram of an ordered metadata structure, according to one embodiment.
Figure 4:
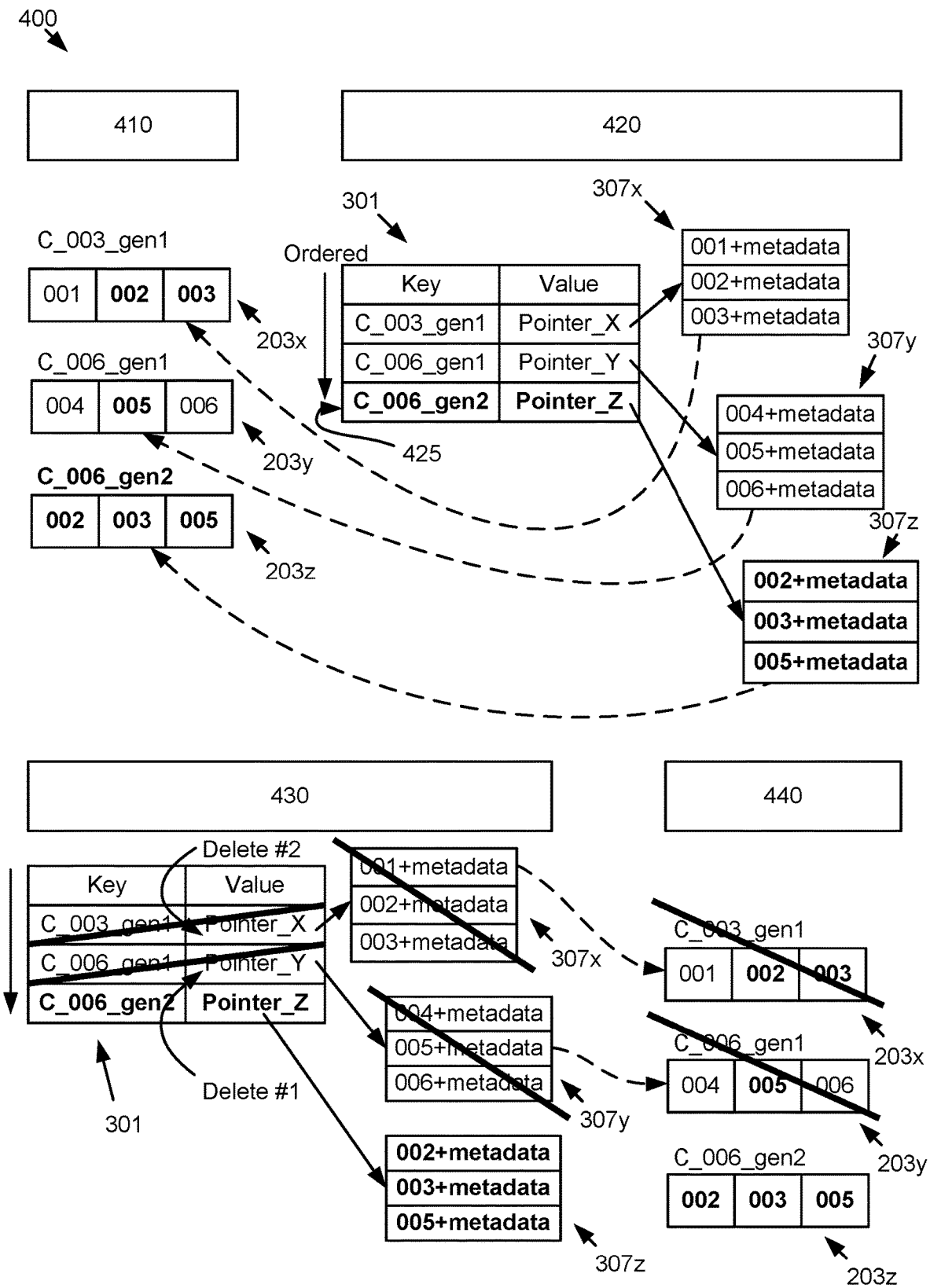
FIG. 4 is a diagram of the merging of two container objects, according to one embodiment.

It is to be understood that although the embodiment described in conjunction with FIG. 2-4 is directed to object storage, in other embodiments the container object manager 101 can operate in other storage architectures. As an example of another possible storage architecture according to some embodiments, servers 105A is depicted as also being connected to a SAN fabric 170 which supports access to storage devices 180(1)-(N). Intelligent storage array 190 is also shown as an example of a specific storage device accessible via SAN fabric 170. As noted above, SAN 170 is shown in FIG. 1 only as an example of another possible architecture to which the container object manager 101 might be applied in another embodiment. In yet other embodiments, shared storage can be implemented using FC and iSCSI (not illustrated) instead of a SAN fabric 170.

Turning to FIG. 2 in one embodiment, the container object manager 101 associates each data object 201 being stored as part of a container object 203 (e.g., 203x, 203y, etc.) grouping with an ordered identifier. The value assigned to an ordered identifier may be any suitable quantitative or qualitative value that is capable of being incremented in value and ordered relative to other values. Any suitable value incrementing and ordering schemes may be used, such as numerical or alphabetical schemes, or any other applicable schemes that can relate, increment, and distinguish values.

The ordered data object identifiers are incremented for successive data objects 201. For example to group and store data objects A, B, C, D, E, F, these data objects could be associated with ordered data object identifiers 001, 002, 003, 004, 005, 006 respectively. The exact format of the ordered data object identifiers is a variable design parameter, with the general idea being that each ordered data object identifier contains a value such that successive data objects 201 grouped to container objects 203 for storage can be associated with ordered data object identifiers with increasing values. As the term is used herein, a value can be any quantitative representation, such that a plurality of values can be ordered from least to greatest.

The container object manager 101 associates each new container object 203 to which a plurality of data objects 201 are being grouped with an ordered container identifier consisting of the highest ordered data object identifier of the data objects 201 grouped to that container object 203. For example, a container object 203x consisting of the data of data objects A, B, C, which are associated with ordered data object identifiers 001, 002, 003, would in turn be associated with an ordered container identifier denoted by the numerical value 003. For example, in FIG. 2, the ordered container identifier denoted by 003 is illustrated as C_003_gen1, with C denoting "container," 003 the highest ordered identifier of the contained data objects and gen1 indicating that this is the first generation of this container object. As explained in detail below, generations of a container objects 203 can be tracked and incremented in the context of container object merging operations. The specific format of an ordered container identifier is a variable design parameter, with the general idea being that such an identifier may contain the greatest value associated with any of the data objects 201 grouped to that container object 203. It is to be understood that although FIG. 2 illustrates three data objects being grouped to each container object, this is just an example, and different numbers of data objects can be grouped to a container object in different embodiments.

In the embodiment illustrated in FIG. 2, a second container object 203y consisting of the data of data objects D, E, F, which are in turn associated with ordered data object identifiers 004, 005, 006, would be associated with an ordered container identifier denoted by the highest value identifying one of the data objects grouped to the container object 203, which in this case is the numerical value 006. Thus, using the example ordered container identifier format of the embodiment illustrated in FIG. 2, the numerical container identifier would be C_006_gen1.

Turning now to FIG. 3, the container object manager 101 stores the ordered container identifiers in ascending order (e.g., in this example numerical order) in an ordered metadata structure 301. In one embodiment, the ordered metadata structure 301 is instantiated in the form of a KVS, with the container identifiers as the keys 303, and pointers to collections 307 (e.g., 307a, 307b, etc.) of the ordered identifiers of the contained data objects plus any additional corresponding metadata as the values 305. For example, as shown in FIG. 3 the first key 303 in the KVS is the ordered container identifier C_003_gen1, and the corresponding value 305 is a pointer that points to a collection 307a of the ordered data object identifiers of the data objects 201 grouped to container object C_003_gen1, as well as their corresponding metadata and a pointer to the data of the container object itself. The second key 303 is the ordered container identifier C_006_gen1, and the corresponding value 305 is a pointer to a collection 307b of the ordered data object identifiers of the data objects 201 of container object C_006_gen1, plus their metadata and a pointer to the container object. A grouping comprising the ordered data object identifiers of a container object, plus metadata and a reference/pointer to (or other mechanism for accessing) the data of the container object is referred to herein as a metadata collection 307. A metadata collection 307 to which a pointer in the ordered metadata structure 301 points can be in the form of a list of the ordered object identifiers and corresponding metadata in ascending order, further comprising a pointer to the data of the container object 203 itself. It is to be understood that the exact format used for the instantiation of a metadata collection 307 is a variable design parameter. It is to be understood further that a KVS is just an example of one way that can be used to instantiate an ordered metadata structure 301, and other storage formats, structures and/or mechanisms can be used in other embodiments. FIG. 3 illustrates the ordered metadata structure 301 containing pointers to the metadata collections 307x and 307y corresponding to the ordered container identifiers on which the metadata structure 301 is keyed. However, it is to be understood that in other embodiments the metadata collections 307 can be included in the ordered metadata structure 301 by value, rather than be reference.

As also shown in FIG. 3, the data container objects C_0003_gen1 and C_006_gen1 contain the data of the data objects grouped thereto, in order according to their corresponding ordered data object identifiers from least to greatest, e.g., 001, 002 and 003 for C_0003_gen1 and 004, 005 and 006 for C_0006_gen1.

In one embodiment the container object manager 101 can process an access request for a specific data object 201 (e.g., a read request) according to the logic described below. To describe a specific example, a read request for data object B associated with ordered data object identifier 002 could be handled by a lookup in the ordered metadata structure 301 (e.g., implemented as a KVS) for the first key 303 comprising an ordered container identifier with a value that is numerically greater than or equal to 002. In this example, such a lookup operation would be directed to the key entry in the ordered KVS comprising C_003_gen1, as it contains the ordered identifier 003, and is thus the first container identifier in the ordered list of the keys 303 of the KVS comprising an ordered identifier greater than or equal to 002. The value entry in the KVS corresponding to key entry C_003_gen1 is a pointer to the corresponding metadata collection 307, which contains the ordered data identifier for data object B (002), as well as a pointer to the data of container object C_003_gen1, which contains the data of the target data object. The information in the metadata collection 307 can thus be utilized to access the actual data of data object B. Similarly, a read request for a data object 201 associated with the ordered data object identifier 004 would result in a lookup operation in the ordered KVS for the first key with an ordered value greater than or equal to 004. This would return the key entry comprising C_006_gen1, which is the first container identifier in the ordered list of the keys of the KVS comprising an ordered identifier greater than or equal to 004.

The use of the ordered metadata structure 301 as described herein enables access operations such as read operations and the like to be handled at the level of the container objects 203, as opposed to the level of each individual data object 201. This results in a smaller, more efficient data structure, with fewer entries than conventional systems. Thus, the scalability of this system is greatly improved, for example in the context of a large-scale distributed storage system. A further advantage of the specific container identifier setup in combination with the ordered metadata structure 301 described herein is speed. The container object manager 101 in conjunction with the functionality described around the ordered metadata structure 301 enables a very fast and efficient lookup operation of the ordered container identifier for a particular data object 203, as a lookup of the first container identifier comprising a number greater than or equal to a given ordered data object identifier is almost as efficient as a lookup operation for a particular number in an ordered data structure.

The utilization of the ordered metadata structure 301 further enables a consistent and robust handling of the merging of adjacent container objects 203. The merging of adjacent container objects 203 is frequently desirable, for example in order to perform a compaction operation to reclaim storage space of deleted or obsolete data objects 201. The container object 203 merging methodology described herein works on container objects 203 that are adjacent, meaning that their container identifiers are consecutive entries in the ordered metadata structure 301, such as the ordered KVS described above. This adjacency limitation is typically not a large hurdle because most data modifications that trigger container compaction and hence merging operations affect data of container objects 203 which were written at a similar time. For example, significant modification often occurs to the most recent data objects 201, which in turn are grouped to the container objects 203 that have been added most recently and hence are adjacent. It is thus such adjacent, most recently added container objects 203 that are frequently the candidates for a compaction operation. As these container objects 203 become older, their data becomes more stable and less likely to be modified. The container objects 203 thus become less likely candidates for a compaction operation. Significant modification also occurs when obsolete data is deleted in bulk, for example data that has reached its legal/compliance retention timeout (e.g., 5 years, 7 years, etc.). Data objects 201 containing data that ages out at the same time tend to be of similar age, and are thus typically grouped to adjacent container objects 203, which become suitable candidates for compaction operations under these circumstances. From the above two examples of significant data modification scenarios, it is demonstrated that non-adjacent container objects 203 are less likely to become suitable candidates for a compaction operation, and its associated merging operation(s).

To provide a specific example of a merge, during a compaction operation both container objects C_003_gen1 and C006_gen1 in the example embodiment shown in FIGS. 2 and 3 could be merged into a new container object 203z comprising the data objects 201 with ordered data object identifiers 002, 003 and 005, for example after deletion of the data objects 201 with ordered data object identifiers 001, 004 and 006. FIG. 4 illustrates the methodology for this example merge method 400, according to one embodiment. As shown in FIG. 4, during block 410, a new container object 203z is created comprising data objects 201 from container objects 203x and 203y, such as but not limited to the data of the data objects 201 with data object identifiers 002, 003 and 005. This new container object 203z is associated with a container identifier denoting a next generation of the container identifier with the greater value of the two container objects being merged. The container identifier with the greater value of the container objects being merged in the illustrated example is C_006_gen1, so the new container object is associated with container identifier C_006_gen2, which is the next generation of container identifier C_006_gen1. It is to be understood that using the alphanumeric indicator of the format gen1, gen2, genN is just an example, and in other embodiments other generation indicator formats can be used as desired.

Next, as shown in FIG. 4, during block 420 of the merge method 400, this new container identifier (e.g., C_006_gen2 in the illustrated example) is inserted in the ordered metadata structure 301 after the container identifier having a greater value (e.g., C_006_gen1 in the illustrated example) of the two container objects (e.g., 203x and 203y) being merged, in association with a pointer to a corresponding metadata collection (e.g., 307z) containing the ordered data object identifiers of the data objects (e.g., 002, 003 and 005) of the new container object (e.g., C_006_gen2), as well as their corresponding metadata, and a pointer to the data of the new container object itself, as reflected by reference numeral 425. Note that after the operations of blocks 410 and 420 of the merge method 400, but prior to block 430, any incoming read requests for the data objects 002, 003 or 005 can still be handled by the entries in the metadata structure 301 for the original container objects being merged (e.g., C_003_gen1 and C_006_gen1 respectively in the illustrated example) as described above, because these entries are still present in the ordered metadata structure 301, and are still the first entries therein with a value greater than or equal to the ordered data object identifier of the data object being requested (002, 003 or 005 in this example).

During block 430, two consecutive delete operations (e.g., delete #1 and delete #2) delete the obsolete container identifiers from the ordered metadata structure 301, along with the corresponding metadata collections 307a and 307b. As shown in FIG. 4, in the illustrated example the first delete operation targets container identifier C_006_gen1 and the second delete operation targets container identifier C_003_gen1. Note that, preferably in some cases, these delete operations of obsolete container identifiers and associated metadata can be executed in order from greatest to least according to the value ordering scheme being used (e.g., numerically greatest to least, alphabetically greatest to least, symbolically greatest to least, etc.), opposite to the order in which the container identifiers appear in the ordered metadata structure 301. This is advantageous because even in the event that any type of error, delay, interference or other problem occurs during the previous blocks/operations, at all times the ordered metadata structure 301 is able to handle a read request by means of a container identifier and corresponding metadata that is able to provide the correct data object 201. In another embodiment the delete operations can be performed in the other order.

During block 440, after the above described deletion of the entries in the ordered metadata structure 301 and the corresponding pointed to metadata collections 307, the actual associated container objects themselves (e.g., C_003_gen1 and C_006_gen1) can be deleted, thereby freeing up storage. This merge method 400 advantageously helps to ensure, during each block, a correct processing of access requests. Even during such a merge operation, a read or other access request for a particular data object 201 will not erroneously return a different data object 201.

In some embodiments, the ordered metadata structure 301, including the pointed to metadata collections 307, is loaded into RAM memory. In this way, the lookup operations can be performed quickly and efficiently without adding any cost to consumption of IOPS and bandwidth associated with reading from disk. Typically, the ordered metadata structure 301 remains small enough that is practicable. In some embodiments, parts or all of the ordered metadata structure 301 can be cached and/or otherwise stored on disk as desired.

In one embodiment, an additional optimization is provided to further increase integrity and consistency in case of significant delays between accessing the ordered metadata data structure 301 and retrieval of the target data, for example due to the container object being accessed having already been deleted, e.g., during block 440 of the merge method 400 as described above. In such a case, an access (e.g., read) request can be processed by a new lookup in the ordered metadata structure 301, which is referred to herein as a retry operation. This will then result in new metadata pointing to the new container object 203 containing the target data object 201. In any case, although the request could result in an operation reporting a missing data object leading to a retry, it is avoided that a read request could potentially return a data object other than the one requested. In the example given above, a read request processed during block 410 for a data object with ordered data object identifier 002 would result in the container identifier C_003_gen1 being retrieved from the metadata. If subsequently blocks 420, 430, and 440 of the merge operation are completed before the data object 002 could be retrieved from the already deleted container object C_003_gen1, then a retry operation should be executed, which would lead to a lookup returning container identifier C_006_gen2 from the ordered metadata structure 301, and enabling retrieval of data object 002 from the new container object C_006_gen2. How long of a delay is considered to meet a given threshold of significance is a variable design parameter.

FIG. 1 illustrates a container object manager 101 residing on a single storage server 105. It is to be understood that this is just an example. The functionalities of the container object manager 101 can be implemented on other computing devices 210 in other embodiments, or can be distributed between multiple computing devices 210. It is to be understood that although the container object manager 101 is illustrated in FIG. 1 as a standalone entity, the illustrated container object manager 101 represents a collection of functionalities, which can be instantiated as a single or multiple modules on one or more computing devices 210 as desired.

It is to be understood the container object manager 101 can be instantiated as one or more modules (for example as object code or executable images) within the system memory 217 (e.g., RAM, ROM, flash memory 254) of any computing device 210, such that when the processor 214 of the computing device 210 processes a module, the computing device 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the container object manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

Note that, although the terms "first," "second," and so forth may be used herein to describe various elements, these elements are not to be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. Also note that the term "and/or" as used herein refers to and encompasses any and/or all possible combinations of one or more of the associated listed items. Furthermore, the terms "comprises" and/or "comprising," when used in this specification, specify the presence of stated features, integers, blocks, steps, operations, elements, and/or components, but do not preclude the presence or addition of one or more other features, integers, blocks, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As will be understood by those skilled in the art, the invention may be embodied in other specific forms without departing from the spirit or essential characteristics thereof. Likewise, the particular naming and division of the portions, modules, servers, managers, components, functions, procedures, actions, layers, features, attributes, methodologies, data structures and other aspects are not mandatory or significant, and the mechanisms that implement the invention or its features may have different names, divisions and/or formats. The foregoing description, for the purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method, comprising:
    assigning ordered data object identifiers with successively incremented values to successive data objects across multiple container objects, the assigning the ordered data object identifiers further comprising assigning an ordered data object identifier denoted by a value to each data object of multiple data objects grouped to a container object of the multiple container objects, by a container object manager executing on a storage server;
    assigning, by the container object manager executing on the storage server, an ordered container identifier to each specific container object of the multiple container objects, each assigned ordered container identifier having a greatest value of an ordered data object identifier assigned to any data object grouped to the specific container object;
    storing, by the container object manager executing on the storage server, an ordered metadata structure with an entry for each specific container object of the multiple container objects, each entry comprising at least the assigned ordered container identifier and a reference to data of the specific one of the container objects, wherein the ordered metadata structure is ordered according to values of ordered container identifiers;
    receiving, by the container object manager executing on the storage server, an access request to access a specific data object grouped to one of the multiple container objects, the access request containing a corresponding ordered data object identifier;
    determining to which container object of the multiple container objects the specific data object is grouped by locating a first ordered container identifier in the ordered metadata structure with a value greater than or equal to the ordered data object identifier of the specific data object, by the container object manager executing on the storage server; and
    utilizing information in an entry of the ordered metadata structure corresponding to the determined container object to which the specific data object is grouped to fulfill the received access request, by the container object manager executing on the storage server.

2. The computer-implemented method of claim 1, wherein storing the ordered metadata structure with the entry for each specific container object of the multiple container objects further comprises:
    maintaining a key and a value for each specific container object of the multiple container objects, wherein keys comprise corresponding ordered container identifiers and values comprise corresponding metadata collections.

3. The computer-implemented method of claim 2, wherein:
    a metadata collection corresponding to a specific container object comprises an ordered data object identifier and corresponding metadata for each specific one of the multiple data objects grouped to the specific container object, and a reference to data of the specific container object.

4. The computer-implemented method of claim 2, wherein:
    a metadata collection corresponding to a specific container object comprises an ordered list of ordered data object identifiers and corresponding metadata for each specific one of the multiple data objects grouped to the specific container object, and a pointer to data of the specific container object.

5. The computer-implemented method of claim 2, wherein:
    values of the ordered metadata structure further comprise references to metadata collections.

6. The computer-implemented method of claim 2, wherein:
    values of the ordered metadata structure further comprise content of metadata collections.

7. The computer-implemented method of claim 2, wherein utilizing information in the entry of the ordered metadata structure corresponding to the determined container object to which the specific data object is grouped to fulfill the received access request further comprises:

using a metadata collection corresponding to the determined container object to access data of the determined container object corresponding to the specific data object.

8. The computer-implemented method of claim 1, further comprising:

merging a first container object and a second container object, the first container object and the second container object having consecutive entries in the ordered metadata structure, the merging of the first container object and the second container object comprising:
creating a new container object;
determining which of the first container object and the second container object has an ordered container object identifier with a greater value;
assigning to the new container object the ordered container object identifier of the determined one of the first container object and the second container object having the ordered container object identifier with the greater value, with an incremented indicator of a number of merge operations to which the determined one of the first container object and the second container object has been subject;
grouping a subset of the multiple data objects grouped to the first container object and to the second container object to the new container object, the subset of the data objects consisting of data objects grouped to the first container object and to the second container object that are to remain in existence after completion of the merging of the first container object and the second container object;
inserting an entry corresponding to the new container object in the ordered metadata structure after an entry corresponding to the determined one of the first container object and the second container object having the ordered container object identifier with the greater value, the inserted entry comprising at least the ordered container object identifier assigned to the new container object and a reference to data of the new container object;
deleting entries in the ordered metadata structure corresponding to the first container object and the second container object, responsive to inserting the entry corresponding to the new container object in the ordered metadata structure; and
deleting the first container object and the second container object after deleting the entries in the ordered metadata structure corresponding to the first container object and the second container object.

9. The computer-implemented method of claim 8, further comprising:

receiving a request to access a certain data object grouped to the new container object, after inserting the entry corresponding to the new container object in the ordered metadata structure and prior to deleting the entries in the ordered metadata structure corresponding to the first container object and the second container object; and
utilizing information in an entry of the ordered metadata structure corresponding to a given one of the first container object or the second container object to which the certain data object is grouped to fulfill the received access request.

10. The computer-implemented method of claim 8, further comprising:

responsive to a delay exceeding a given threshold between accessing the ordered metadata structure and retrieval of the specific data object, retrying to access the specific data object by executing a new lookup in the ordered metadata structure.

11. The computer-implemented method of claim 8, wherein deleting the entries in the ordered metadata structure corresponding to the first container object and the second container object further comprises:

deleting the entry in the ordered metadata structure corresponding to the determined one of the first container object and the second container object having the ordered container object identifier with the greater value.

12. The computer-implemented method of claim 1, further comprising:

storing the ordered metadata structure in random access memory.

13. The computer-implemented method of claim 1, wherein:

the received access request further comprises a read request.

14. A computer system comprising:

a container object manager configured to:
assign ordered data object identifiers with successively incremented values to each successive data object across multiple container objects;
assign an ordered container identifier to each specific container object of the multiple container objects, wherein each assigned ordered container identifier has a greatest value of an ordered data object identifier assigned to any data object grouped to the specific container object;
store an ordered metadata structure with an entry for each specific container object of the multiple container objects;
receive an access request to access a specific data object grouped to one of the multiple container objects, wherein the access request contains a corresponding ordered data object identifier;
determine to which container object of the multiple container objects the specific data object is grouped by locating a first ordered container identifier in the ordered metadata structure with a value greater than or equal to the ordered data object identifier of the specific data object; and
fulfill, based on an entry of the ordered metadata structure corresponding to the determined container object to which the specific data object is grouped, the received access request.

15. The computer system of claim 14, wherein the container object manager is further configured to:

maintain a key and a value for each specific container object of the multiple container objects, wherein keys comprise corresponding ordered container identifiers and values comprise corresponding metadata collections.

16. The computer system of claim 15, wherein the container object manager is further configured to:

use a metadata collection corresponding to the determined container object to access data of the determined container object corresponding to the specific data object.

17. The computer system of claim 14, wherein the container object manager is further configured to:

create a new container object;
determine which of a first container object and a second container object has an ordered container object identifier with a greater value, wherein the first container object and the second container object have consecutive entries in the ordered metadata structure;

assign to the new container object the ordered container object identifier of the determined one of the first container object and the second container object having the ordered container object identifier with the greater value;

group a subset of data objects grouped to the first container object and to the second container object to the new container object, wherein the subset of data objects consists of data objects grouped to the first container object and to the second container object that are to remain in existence after completion of merging of the first container object and the second container object;

insert an entry corresponding to the new container object in the ordered metadata structure after an entry corresponding to the determined one of the first container object and the second container object having the ordered container object identifier with the greater value;

delete, responsive to inserting the entry corresponding to the new container object in the ordered metadata structure, entries in the ordered metadata structure corresponding to the first container object and the second container object; and delete, after deleting the entries in the ordered metadata structure corresponding to the first container object and the second container object, the first container object and the second container object.

18. The computer system of claim 17, wherein the container object manager is further cofigured to:

receive an access request to access a certain data object grouped to the new container object:

after inserting the entry corresponding to the new container object in the ordered metadata structure; and prior to deleting the entries in the ordered metadata structure corresponding to the first container object and the second container object; and fulfill, based on an entry of the ordered metadata structure corresponding to a given one of the first container object or the second container object to which the certain data object is grouped to fulfill the received access request.

19. The computer system of claim 17, wherein the container object manager is further configured to:

execute, responsive to a delay exceeding a given threshold between accessing the ordered metadata structure and retrieval of the specific data object, a new lookup in the ordered metadata structure.

20. A system comprising:

means for assigning ordered data object identifiers with successively incremented values to successive data objects across multiple container objects, wherein the means for assigning the ordered data object identifiers further comprises:

assigning an ordered data object identifier denoted by a value to each data object of multiple data objects grouped to a container object of the multiple container objects;

means for assigning an ordered container identifier to each specific container object of the multiple container objects, wherein each assigned ordered container identifier has a greatest value of an ordered data object identifier assigned to any data object grouped to the specific container object;

means for storing an ordered metadata structure with an entry for each specific container object of the multiple container objects, wherein:

each entry comprises:

the assigned ordered container identifier; and a reference to data of the specific one of the container objects; and the ordered metadata structure is ordered according to values of ordered container identifiers;

means for receiving an access request to access a specific data object grouped to one of the multiple container objects, wherein the access request contains a corresponding ordered data object identifier;

means for determining to which container object of the multiple container objects the specific data object is grouped by locating a first ordered container identifier in the ordered metadata structure with a value greater than or equal to the ordered data object identifier of the specific data object; and means for fulfilling, utilizing information in an entry of the ordered metadata structure corresponding to the determined container object to which the specific data object is grouped, the received access request.

* * * * *